United States Patent
Kim et al.

(10) Patent No.: US 11,757,155 B2
(45) Date of Patent: Sep. 12, 2023

(54) SEPARATOR FOR SECONDARY BATTERIES HAVING NO SEPARATOR SUBSTRATE

(71) Applicant: LG CHEM, LTD., Seoul (KR)

(72) Inventors: Min Ji Kim, Daejeon (KR); Kwan Woo Nam, Daejeon (KR); Seung Hyun Lee, Daejeon (KR); Je An Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 16/964,178

(22) PCT Filed: Aug. 30, 2019

(86) PCT No.: PCT/KR2019/011213
§ 371 (c)(1),
(2) Date: Jul. 22, 2020

(87) PCT Pub. No.: WO2020/050559
PCT Pub. Date: Mar. 12, 2020

(65) Prior Publication Data
US 2021/0036289 A1 Feb. 4, 2021

(30) Foreign Application Priority Data
Sep. 3, 2018 (KR) .................... 10-2018-0104608

(51) Int. Cl.
*H01M 50/446* (2021.01)
*H01M 50/46* (2021.01)
(Continued)

(52) U.S. Cl.
CPC ......... *H01M 50/446* (2021.01); *H01M 4/623* (2013.01); *H01M 50/443* (2021.01);
(Continued)

(58) Field of Classification Search
CPC ........................ H01M 50/409; H01M 50/44
See application file for complete search history.

(56) References Cited

U.S. PATENT DOCUMENTS 5,158,844 A   10/1992  Hagens et al.
9,142,357 B2   9/2015  Matsumoto
(Continued)

FOREIGN PATENT DOCUMENTS

CN   102008902 B   3/2013
CN   102516585 B   12/2014
(Continued)

OTHER PUBLICATIONS

International Search Report (with partial translation) and Written Opinion issued in corresponding International Patent Application No. PCT/KR2019/011213, dated Dec. 2, 2019.
(Continued)

*Primary Examiner* — Stephan J Essex
(74) *Attorney, Agent, or Firm* — Morgan, Lewis & Bockius LLP

(57) ABSTRACT

Disclosed herein is a separator for secondary batteries, configured to provide insulation between a positive electrode and a negative electrode, wherein the separator comprises no polyolefin substrate, is configured to have a layer structure comprising a fibrous support, inorganic particles, and a binder, and has improved dimensional stability.

19 Claims, 5 Drawing Sheets

(51) Int. Cl.
*H01M 4/62* (2006.01)
*H01M 50/494* (2021.01)
*H01M 50/497* (2021.01)
*H01M 50/443* (2021.01)

(52) U.S. Cl.
CPC ....... *H01M 50/461* (2021.01); *H01M 50/494* (2021.01); *H01M 50/497* (2021.01)

(56) References Cited

U.S. PATENT DOCUMENTS

| | | | |
|---|---|---|---|
| 10,069,127 | B2 | 9/2018 | Lee et al. |
| 2011/0003209 | A1* | 1/2011 | Katayama ............ H01M 50/411 |
| | | | 429/246 |
| 2013/0302702 | A1 | 11/2013 | Matsumoto |
| 2015/0171397 | A1* | 6/2015 | Yamada ................ H01M 50/44 |
| | | | 429/144 |
| 2015/0333306 | A1 | 11/2015 | Lee et al. |
| 2016/0093858 | A1* | 3/2016 | Saegusa ............. H01M 50/446 |
| | | | 429/144 |

FOREIGN PATENT DOCUMENTS

| | | | |
|---|---|---|---|
| CN | 105470436 | A | 4/2016 |
| CN | 106299213 | A | 1/2017 |
| JP | 2011154937 | A * | 8/2011 |
| JP | 4922664 | B2 | 4/2012 |
| JP | 2013-037853 | A | 2/2013 |
| JP | 2014-107061 | A | 6/2014 |
| JP | 2014107061 | A * | 6/2014 |
| JP | 5575537 | B2 | 8/2014 |
| JP | 5962647 | B2 | 8/2016 |
| JP | 2018-063925 | A | 4/2018 |
| JP | 2018-063926 | A | 4/2018 |
| JP | 2018-147769 | A | 9/2018 |
| KR | 10-1213567 | B1 | 12/2012 |
| KR | 10-1283013 | B1 | 7/2013 |
| KR | 10-2014-0072696 | A | 6/2014 |
| KR | 10-2016-0054937 | A | 5/2016 |
| KR | 10-2016-0109669 | A | 9/2016 |
| KR | 10-2018-0081472 | A | 7/2018 |

OTHER PUBLICATIONS

Extended European Search Report issued by the European Patent Office dated Jan. 12, 2021 in corresponding European patent application No. 19856841.2.

* cited by examiner

[FIG. 1]
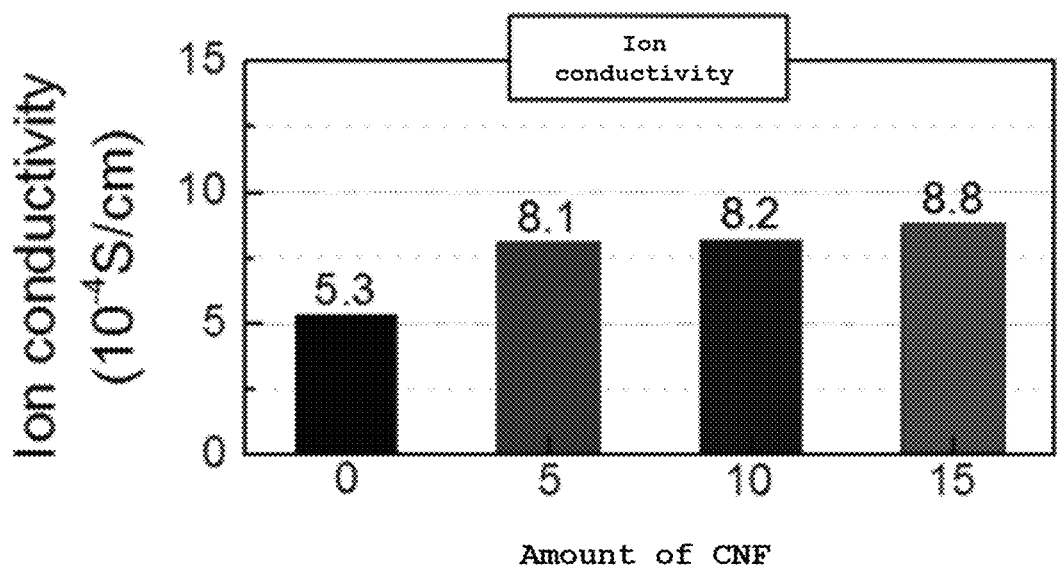

[FIG. 2]
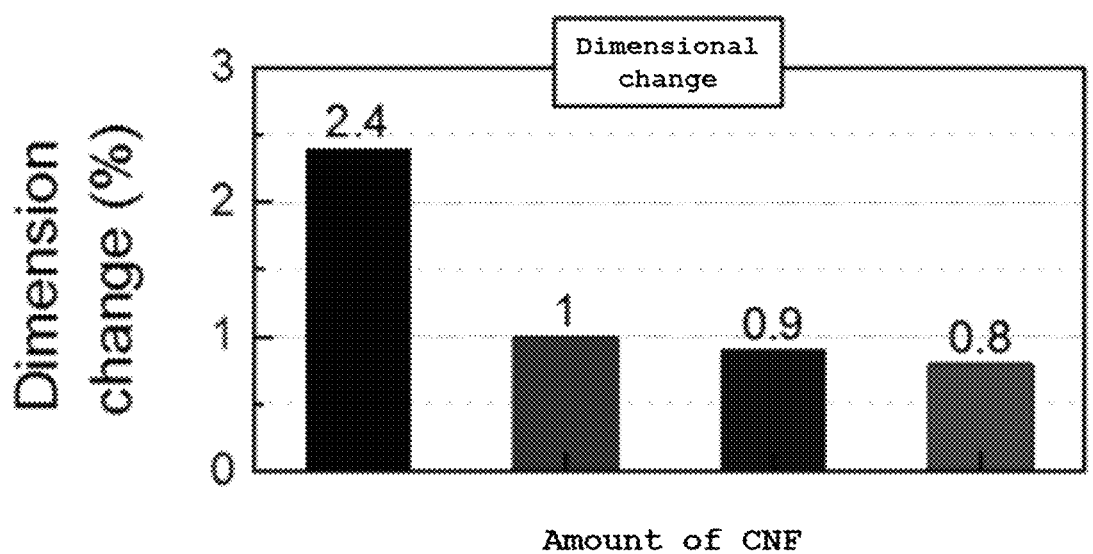

[FIG. 3]
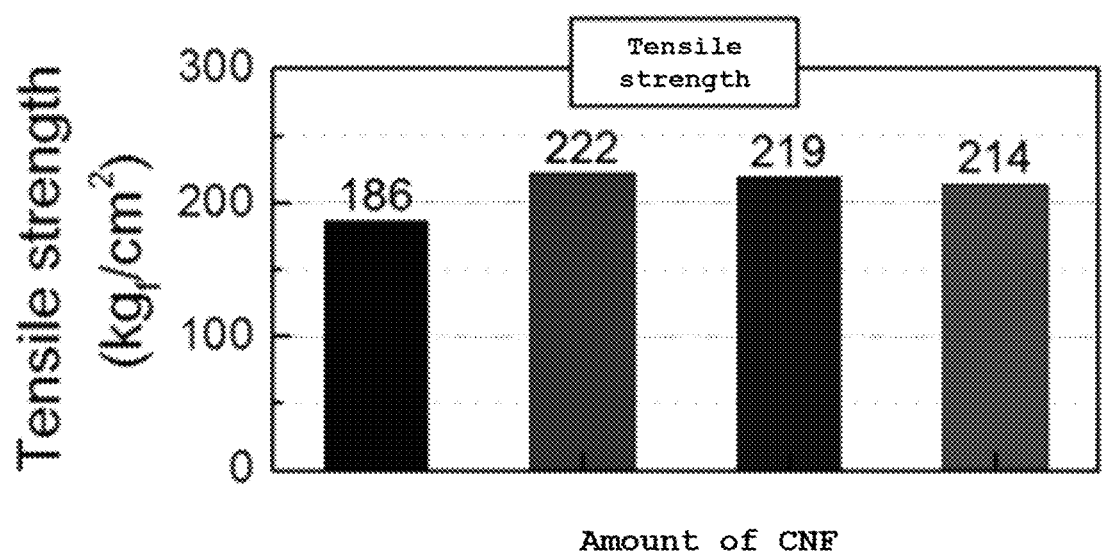

[FIG. 4]
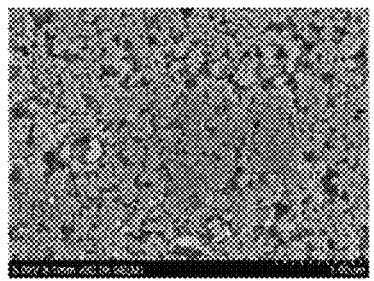
Example 1
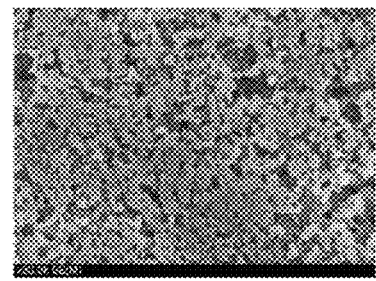
Example 2
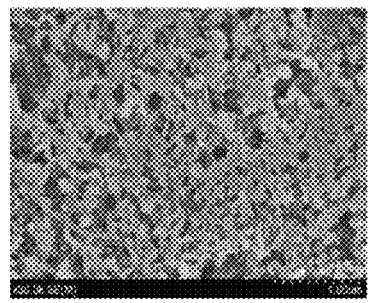
Example 3
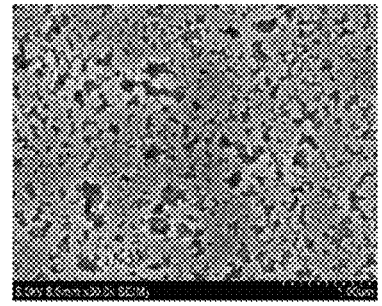
Comparative Example 1

[FIG. 5]
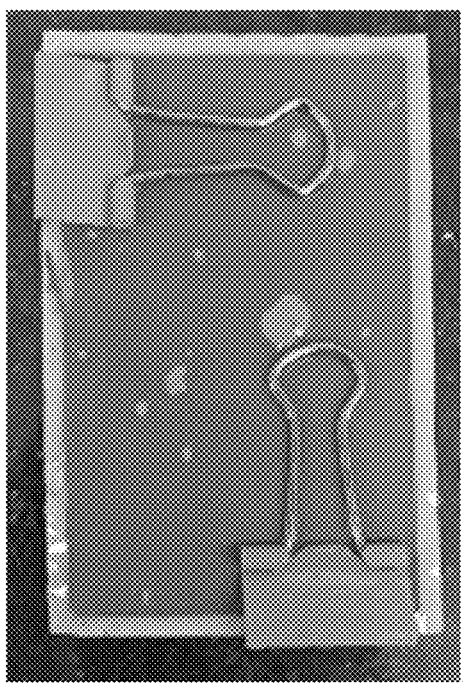 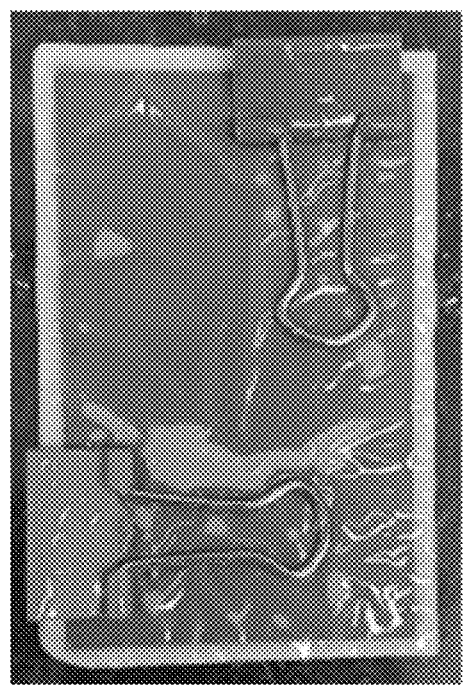
Example 2          Comparative Example 1

SEPARATOR FOR SECONDARY BATTERIES HAVING NO SEPARATOR SUBSTRATE

TECHNICAL FIELD

This application claims the benefit of priority to Korean Patent Application No. 2018-0104608 filed on Sep. 3, 2018, the disclosure of which is hereby incorporated by reference herein its entirety.

The present invention relates to a separator for secondary batteries having no separator substrate, and more particularly to a separator for secondary batteries having a layer structure comprising a fibrous support, inorganic particles, and a binder in order to improve dimensional change, which is a disadvantage of the separator having no separator substrate.

BACKGROUND ART

With the abrupt growth of markets related to mobile devices, lithium secondary batteries have also come to be used as the energy storage system and power sources for electric vehicles (EV) and hybrid electric vehicles (HEV).

The lithium secondary batteries are configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. It is necessary for the separator to electrically isolate the positive electrode and the negative electrode from each other and to exhibit high ion permeability, high mechanical strength and stability at high temperature such that an electrolytic solution can pass smoothly through the separator.

A conventional separator including a separator substrate and an inorganic coating layer has a problem in that the force of adhesion between the separator and an electrode is low, whereby the separator and the electrode are locally separated from each other or wrinkles are formed at the interface between the separator and the electrode. In addition, polyolefin, which is commonly used as a separator substrate, has a thermal stability problem in which polyolefin melts at a high temperature.

In order to fundamentally solve these problems, a separator comprising an inorganic coating layer alone without a polyolefin separator substrate has been proposed. However, the separator has a problem in that appearance defects are caused due to the change of a predetermined dimension of the separator as a result of the increase of the thickness of the separator as the separator is swelled in the electrolyte and as a result of stretching in both the machine direction (MD) and the transverse direction (TD), respectively.

In addition, when the dimensional change is high, bubbles may occur inside the boundary between the electrode and the separator as the boundary between the electrode and the separator is separated. As a result, lithium is precipitated due to an increase in interfacial resistance, thereby rapidly increasing cell resistance.

In this regard, Patent Document 1 discloses a separator for non-aqueous electrolyte batteries made of inorganic fiber paper, in which the inorganic fiber paper is manufactured substantially with inorganic materials alone having 60 to 97 wt % of inorganic fiber with an average fiber diameter of 4 μm or less and 3 wt % to 40 wt % of inorganic binder having a silica-system scaly inorganic matter as a main material, wherein the inorganic fiber is coupled by the inorganic binder.

Patent Document 1 relates to the separator comprising the inorganic fiber and the inorganic binder without a separator substrate. However, the separator of Patent Document 1 is configured to have that the amount of the inorganic fiber is higher than the amount of the inorganic binder and the electrolyte solution wettability is improved.

Patent Document 2 discloses a separator comprising a substrate layer, a first nanofiber layer including a first nanofiber, and a second nanofiber layer including a second nanofiber and inorganic particles.

The separator of Patent Document 2 comprises nanofiber layers comprising nanofiber and provides a function to suppress damage of nanofiber being peeled off during the manufacturing process of a separator. However, since the separator of Patent Document 2 comprises the substrate layer, a method which can lower dimensional change as a separator including no substrate layer has not yet been suggested.

As such, when using a separator in which a separator substrate is omitted in order to improve thermal stability, there is a high need for the development of a separator having improved dimensional stability to prevent dimensional change of the separator by swelling in the electrolyte solution.

PRIOR ART DOCUMENT

Patent Document 1 Japan Registered Patent No. 4922664
Patent Document 2 Korea Registered Patent No. 1213567

DISCLOSURE

Technical Problem

The present invention has been made in view of the above problems, and it is an object of the present invention to provide a separator for secondary batteries having no polyolefin substrate, which provides improved dimensional stability with high swelling resistance to an electrolyte solution by applying a layer structure comprising a fibrous support to the separator.

Technical Solution

In accordance with an aspect of the present invention, the above and other objects can be accomplished by the provision of a separator for secondary batteries configured to provide the insulation between a positive electrode and a negative electrode, the separator for secondary batteries does not include a polyolefin substrate, and may be configured to have a layer structure comprising a fibrous support, inorganic particles, and a binder.

In addition, the fibrous support may have swelling resistance to an electrolyte solution.

In addition, the fibrous support may be at least one selected from the group consisting of cellulose nanofibers (CNF), cellulose microfibers, and aramid fibers.

In addition, an amount of the fibrous support may be 5 wt % to 15 wt % based on a total weight of the separator.

In addition, a thickness of the separator for secondary batteries may be 5 μm to 50 μm.

In addition, dimensional change of the separator for secondary batteries may be 1% or less.

In addition, the binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene monomer (EPDM), sulfonated EPDM, styrene butadiene rubber (SBR), fluoro rubber, and polyimide.

In addition, the binder may further comprise at least one selected from among baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, and an aqueous or non-aqueous polymer consisting of fatty acid system.

In addition, the inorganic particles may be inorganic particles having a dielectric constant of 1 or more, inorganic particles having piezoelectricity, inorganic particles having lithium ion transfer ability, or a mixture of two or more thereof.

In addition, the layer structure may be configured to have a structure in which the fibrous support, the inorganic particles, and the binder are uniformly mixed.

In addition, the layer structure may further comprise an adhesive material, the adhesive material has improved adhesive strength when the adhesive material is melted upon thermocompression.

The present invention also provides an electrode assembly for secondary batteries configured to have a structure in which a positive electrode and a negative electrode are stacked with the separator for secondary batteries interposed therebetween.

BRIEF DESCRIPTION OF DRAWINGS

FIG. 1 is a graph showing the results of measurement of the ion conductivity of a separator in Experimental Example 1.

FIG. 2 is a graph showing the results of measurement of the dimensional change of the separator in Experimental Example 1.

FIG. 3 is a graph showing the results of measurement of the tensile strength of the separator in Experimental Example 1.

FIG. 4 is SEM photographs of separators prepared in Examples 1 to 3 and Comparative Example 1.

FIG. 5 is photographs of an electrode assembly used in Experimental Example 3.

BEST MODE

In accordance with an aspect of the present invention, there is provided a separator for secondary batteries configured to provide insulation between a positive electrode and a negative electrode, wherein the separator does not include a polyolefin substrate, and may be configured to have a layer structure comprising a fibrous support, inorganic particles, and a binder.

Compared to a conventional separator, the separator according to the present invention does not include a polyolefin-based separator substrate. The conventional separator includes a polyolefin-based separator substrate, to one surface of which an inorganic layer including an inorganic material and a binder is applied. In the present invention, however, the conventional separator substrate is omitted, and the separator is made of materials constituting an inorganic layer.

On the other hand, as another conventional separator, there is a separator including an inorganic layer alone as a separator. The overall strength of the conventional separator becomes low, since the separator includes no polyolefin separator substrate. As a result, the separator interposed between the electrode assemblies may be damaged, whereby a short circuit may occur.

In addition, since the conventional separator tends to swell due to the high impregnation to the electrolyte solution, the thickness of the conventional separator increases. There is a disadvantage that the dimensions of the separator set are changed as a result of being stretched in each of the MD (Machine Direction) direction and the TD (Transverse Direction) direction.

Thus, the present invention comprises a fibrous support in the layer structure defining the separator, thereby preventing the separator from expanding or stretching. In particular, when using a material having swelling resistance to the electrolyte solution as the fibrous support, it is possible to maintain the impregnation of the electrolyte solution to ensure the ion conductivity and to reduce the dimensional change of the separator.

Therefore, it is possible to prevent the resistance of the battery from increasing as a result of a gap at the boundary between the electrode and the separator due to the high rate of dimensional change of the separator.

The fibrous support is not particularly restricted, as long as the fibrous support may be applied as a support in the layer structure of the separator and has a swelling resistance to the electrolyte solution. For example, the fibrous support may be at least one selected from the group consisting of cellulose nanofibers (CNF), cellulose microfibers, and aramid fibers.

In a concrete example, the amount of the fibrous support may be 1 wt % to 30 wt % based on the total weight of the separator, and particularly 5 wt % to 15 wt % based on a total weight of the separator.

In the case in which the amount of the fibrous support is less than 1 wt %, it is difficult to achieve the purpose of improving the dimensional stability, which is undesirable. In the case in which the amount of the fibrous support is greater than 30 wt %, it is difficult to have a coating process for forming the layer structure due to an increase of the viscosity of a slurry for forming the layer structure, which is undesirable.

The separator may have a thickness in the range of 5 μm to 50 μm, and particularly in the range of 10 μm to 25 μm.

In the case in which the thickness of the separator is less than 5 μm, there is a problem that the durability of the separator is poor, which is undesirable. In the case in which the thickness of the separator is greater than 50 μm, there is a problem that the overall thickness of the electrode assembly is increased thereby reducing the capacity of the battery, which is undesirable.

The inorganic particles may form empty spaces among the inorganic particles, and thereby may form micro pores and maintain a physical shape as a spacer. The physical characteristics of the inorganic particles, which are used in the separator, are not generally changed at a temperature of 150° C. or more.

The inorganic particles are not particularly restricted, as long as the inorganic particles are electrochemically stable. That is, the inorganic particles that can be used in the present invention are not particularly restricted as long as the inorganic particles are not oxidized and/or reduced within the operating voltage range (e.g. 0 to 5 V based on Li/Li+) of a battery to which the inorganic particles are applied. In the case in which inorganic particles having high electrolyte ion transfer ability are used, it is possible to improve the performance of an electrochemical device. Consequently, it is preferable for the electrolyte ion transfer ability of the inorganic particles to be as high as possible. In the case in which the inorganic particles have high density, it may be difficult to disperse the inorganic particles at the time of forming the separator, and the weight of a battery may increase at the time of manufacturing the battery. For these reasons, it is preferable for the density of the inorganic particles to be low. In the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, alumina hydrate, or a mixture of two or more thereof.

Examples of the inorganic particles having a dielectric constant of 1 or more may include $SrTiO_3$, $SnO_2$, $CeO_2$, MgO, NiO, CaO, ZnO, $ZrO_2$, $Y_2O_3$, $Al_2O_3$, $TiO_2$, SiC, or a mixture thereof. However, the present invention is not limited thereto.

The inorganic particles having piezoelectricity are a material that is a nonconductor at normal pressure but, when a certain pressure is applied thereto, exhibits conductivity due to a change in the internal structure thereof. The inorganic particles have a high dielectric value, e.g. a dielectric constant of 100 or more. When the inorganic particles are tensioned or compressed with a certain pressure, electric charges are generated. One face is charged as a positive pole and the other face is charged as a negative pole, whereby a potential difference is generated between the two faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the separator, and potential differences in particles may occur due to the piezoelectricity of the inorganic particles. Accordingly, electron migration, namely, fine current flow, is achieved between the two electrodes, whereby the voltage of the battery is gradually reduced, and therefore the safety of the battery may be improved.

Examples of the inorganic particles having piezoelectricity may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ion conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.75}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof. However, the present invention is not limited thereto.

On the other hand, in the case in which the inorganic particles having high permittivity, the inorganic particles having piezoelectricity, and the inorganic particles having lithium ion transfer ability are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 μm to 10 μm. In the case in which the size of each of the inorganic particles is less than 0.001 μm, dispersibility is reduced, whereby it is difficult to adjust the physical properties of the separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

The binder may become a gel when the binder is impregnated with a liquid electrolytic solution, whereby the binder may have a high rate of electrolytic solution impregnation. For the binder polymer having a high rate of electrolytic solution impregnation, an electrolytic solution injected after the assembly of a battery permeates into the polymer, and the polymer impregnated with the electrolytic solution exhibits electrolyte ion transfer ability. Compared to a conventional hydrophobic polyolefin-based separator, wetting of the separator in the electrolytic solution may be improved, and it is possible to use polar electrolytic solutions for batteries, which has been difficult conventionally. Therefore, the binder polymer may have a solubility parameter of 15 $MPa^{1/2}$ to 45 $MPa^{1/2}$, preferably 15 $MPa^{1/2}$ to 25 $MPa^{1/2}$ and 30 $MPa^{1/2}$ to 45 $MPa^{1/2}$. In the case in which the solubility parameter of the binder polymer is less than 15 $MPa^{1/2}$ and greater than 45 $MPa^{1/2}$, it is difficult to impregnate the binder with a general electrolytic solution for batteries.

In a concrete example, the layer structure may be configured to have a structure in which the fibrous support, the inorganic particles, and the binder are uniformly mixed. When a fibrous support is formed in a separate layered structure on a structure made of inorganic particles and a binder, it is not preferable that the fibrous support is difficult to serve as the overall support of the separator.

In another concrete example, the layer structure may comprise an adhesive material to improve the bonding force with electrodes. The adhesive material may be formed of a material having a property of melting and improving adhesive force when laminating by applying high temperature and high pressure in a state in which the separator, a positive electrode, and a negative electrode are stacked in order to manufacture an electrode assembly.

The present invention also provides an electrode assembly for secondary batteries configured to have a structure in which a positive electrode and a negative electrode are stacked with the separator for secondary batteries interposed therebetween.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 µm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 wt % to 30 wt % based on the total weight of the mixture including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 wt % to 30 wt % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene monomer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 µm to 500 µm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a non-graphitized carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me':Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a secondary battery including the electrode assembly.

Specifically, the secondary battery may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and a power storage system. However, the present invention is not limited thereto.

The structure and manufacturing method of the device are well known in the art to which the present invention pertains, and a detailed description thereof will be omitted.

Hereinafter, the present invention will be described with reference to the following examples. These examples are provided only for illustration of the present invention and should not be construed as limiting the scope of the present invention.

Example 1

A slurry was prepared such that NMP (N-Methylpyrrolidone) was added as a solvent to a mixture using 5 wt % of cellulose nanofibers as a fibrous support, 47.5 wt % of polyvinylidene fluoride (PVdF) as a binder, and 47.5 wt % of boehmite as inorganic particles.

The slurry was formed so as to have the shape of a separator, and then was dried for 30 minutes at 150° C. in order to manufacture the separator.

Example 2

A separator was manufactured using the same method as in Example 1, except that NMP was added as a solvent to a mixture using 10 wt % of cellulose nanofibers as a fibrous support, 47.5 wt % of polyvinylidene fluoride-hexafluoropropylene (PVdF-HFP) as a binder, and 42.5 wt % of boehmite as inorganic particles.

Example 3

A separator was manufactured using the same method as in Example 1, except that NMP was added as a solvent to a mixture using 15 wt % of cellulose nanofibers as a fibrous support, 47.5 wt % of polyvinylidene fluoride-hexafluoropropylene (PVdF-HFP) as a binder, and 37.5 wt % of boehmite as inorganic particles.

Comparative Example 1

A separator was manufactured using the same method as in Example 1, except that a slurry was prepared using only 50 wt % of polyvinylidene fluoride (PVdF) as a binder and 50 wt % of boehmite as inorganic particles without adding a fibrous support in Example 1.

Experimental Example 1

Measurement of Physical Properties

Ion conductivity, dimensional change and tensile strength were measured to confirm the physical properties of the separators manufactured according to Examples 1 to 3 and Comparative Example 1. The results of measurement are shown in Table 2 and FIGS. 1 to 3 below.

In addition, SEM photographs of the separators of Examples 1 to 3 and Comparative Example 1 are shown in FIG. 4.

TABLE 1

|  | Example 1 | Example 2 | Example 3 | Comparative Example 1 |
|---|---|---|---|---|
| Ion conductivity ($10^{-4}$ S/cm) | 8.1 | 8.2 | 8.8 | 5.3 |
| Dimensional change (%) | 1 | 0.9 | 0.8 | 2.4 |
| Tensile strength (kgf/cm) | 222 | 219 | 214 | 186 |

Referring to Table 1 and FIGS. 1 to 4, as the amount of the fibrous support increases, the ion conductivity increases because a space between the fibrous supports defining the separator is formed as the amount of the fibrous support increases and then the space serves as a path for electron transfer.

In addition, as the amount of the fibrous support increases, the dimensional change decreases. As shown in FIG. 4, since the amount of the fibrous support observed on the surface increases as the amount of the fibrous support increases, the role of support of the separator is enhanced and the dimensional change is suppressed, thereby improving dimensional stability.

In addition, the tensile strength of Examples 1 to 3 shows an increased value when compared with Comparative Example 1, which does not include a fibrous support. However, it can be seen that the tensile strength of Examples 1 to 3 decreases slightly as the amount of the fibrous support increases.

As in Examples 1 to 3, as the amount of the inorganic particles decreases and the amount of the fibrous support increases, the total surface area of the fibrous support, which is an undissolved material, increases. When the surface area is increased as described above, the binder becomes relatively dense toward the surface, and the amount of the binder is relatively decreased in portions other than the surface. Since the binder in the free state affecting the tensile strength is present in portions other than the surface, the amount of the binder affecting the tensile strength is decreased. Therefore, it is determined that the tensile strength decreases as the amount of the fibrous support increases.

Example 4

A separator was manufactured using the same method as in Example 2, except that cellulose microfibers were used instead of cellulose nanofibers as the fibrous support in Example 2.

Comparative Example 2

Polyethylene was used to form a shape of a separator and then was dried to manufacture a separator.

Comparative Example 3

The slurry prepared in Comparative Example 1 was coated on the separator used in Comparative Example 2 and dried for 30 minutes at 150° C. in order to manufacture the separator.

Experimental Example 2

Evaluation of Thermal Stability

After the separators manufactured in Examples 2, 4, and Comparative Examples 1 to 3 were stored for 10 minutes in a chamber maintained at 220° C., the thermal shrinkage was evaluated by comparing the length before and after the experiment.

The evaluation results of the thermal shrinkage of the samples are shown in Table 2 below.

TABLE 2

|  | Thermal shrinkage (%) |
| --- | --- |
| Example 2 | 0 |
| Example 4 | 0 |
| Comparative Example 1 | 0 |
| Comparative Example 2 | 80 |
| Comparative Example 3 | 16 |

Referring to Table 2, the separators of Example 2, Example 4, and Comparative Example 1, which have no separate substrate, showed the thermal shrinkage of 0%. On the other hand, Comparative Example 2, having the separator made only of polyethylene material, showed the highest thermal shrinkage of 80%. The separator of Comparative Example 3, which used the separator of Comparative Example 2 as a substrate and was coated with a coating layer comprising a binder and inorganic particles, showed the thermal shrinkage of 16%.

As such, it can be seen that the thermal shrinkage is significantly improved in the separator in which the separator substrate is omitted.

Experimental Example 3

An electrode assembly was manufactured using the separators prepared in Example 2 and Comparative Example 1.

Particularly, the electrode assembly was manufactured by stacking so as to have a structure of the separator/positive electrode/separator/negative electrode/separator. The size of the positive electrode and the negative electrode was 4×6.5 cm$^2$, and the separator was cut to the size of 4.5×7.0 cm$^2$.

After setting the temperature of the laminator to 100° C., the electrode assembly was laminated by pressing. Then, the electrode assembly was fixed with binder clips as shown in FIG. 5 and was stored in the electrolyte solution for 1 day. Then, the electrode assembly was removed from the electrolyte solution and the deformation of the separator was observed.

Referring to FIG. 5, it can be seen that wrinkles hardly occurred in the electrode assembly using the separator of Example 1 comprising the fibrous support. However, as for the separator of Comparative Example 1 having no fibrous support, it can be seen that the electrode assembly was stretched as a whole, and wrinkles have occurred. In other words, in the case of using the separator according to the present invention, it is possible to obtain an effect that the dimensional change is remarkably lowered to 0.9%. Therefore, the problem of increasing resistance due to the separation of the boundary between the separator and the electrode and the problem of decreasing the adhesive force between the separator and the electrode can be prevented.

Those skilled in the art to which the present invention pertains will appreciate that various applications and modifications are possible based on the above description, without departing from the scope of the present invention.

INDUSTRIAL APPLICABILITY

As described above, since a separator for secondary batteries according to the present invention does not include a polyolefin-based separator substrate melted at a high temperature, thermal stability can be ensured.

In addition, since a layer structure defining the separator comprises a fibrous support having high swelling resistance, it is possible to prevent the problem of a conventional separator that the resistance is increased by bubbles generated at the boundary between an electrode and a separator as the electrode and the separator are separated due to the swelling of separator in the electrolyte solution.

The invention claimed is:

1. A separator for secondary batteries, configured to provide electrical insulation between a positive electrode and a negative electrode, wherein
the separator for secondary batteries comprises no polyolefin substrate, and has a layer structure comprising a fibrous support, inorganic particles, and a binder,
the separator includes 37.5 wt % to 47.5 wt % of the inorganic particles based on a total amount of the separator,
wherein an amount of the fibrous support is 5 wt % to 15 wt % based on a total weight of the separator,
the fibrous support comprises cellulose, and
the inorganic particles comprises boehmite.

2. The separator for secondary batteries according to claim 1, wherein the fibrous support has swelling resistance to an electrolyte solution.

3. The separator for secondary batteries according to claim 1, wherein the fibrous support comprises at least one selected from the group consisting of cellulose nanofibers (CNF), cellulose microfibers, and aramid fibers.

4. The separator for secondary batteries according to claim 1, wherein a thickness of the separator is 5 μm to 50 μm.

5. The separator for secondary batteries according to claim 1, wherein the binder comprises at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene monomer (EPDM), sulfonated EPDM, styrene butadiene rubber (SBR), fluoro rubber, and polyimide.

6. The separator for secondary batteries according to claim 5, wherein the binder further comprises at least one selected from among baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, an aqueous or non-aqueous polymer consisting of fatty acid system.

7. The separator for secondary batteries according to claim 1, wherein the inorganic particles are inorganic particles having a dielectric constant of 1 or more, inorganic particles having piezoelectricity, inorganic particles having lithium ion transfer ability, or a mixture of two or more thereof.

8. The separator for secondary batteries according to claim 1, wherein the fibrous support, the inorganic particles, and the binder are uniformly mixed.

9. The separator for secondary batteries according to claim 1, wherein the layer structure further comprises an adhesive material, the adhesive material has improved adhesive force when the adhesive material is melted upon thermocompression.

10. An electrode assembly for secondary batteries configured to have a structure in which a positive electrode and a negative electrode are stacked with the separator for secondary batteries according to claim 1 interposed therebetween.

11. The separator for secondary batteries according to claim 1, wherein the fibrous support comprises cellulose nanofibers (CNF).

12. The separator for secondary batteries according to claim 1, wherein the fibrous support comprises aramid fibers.

13. A separator for secondary batteries, configured to provide electrical insulation between a positive electrode and a negative electrode, wherein
the separator for secondary batteries comprises no polyolefin separator substrate, and has a layer structure comprising a fibrous support, inorganic particles, and a binder, and
the fibrous support comprises aramid fibers,
the separator includes 37.5 wt % to 47.5 wt % of the inorganic particles based on a total weight of the separator,
an amount of the fibrous support is 5 wt % to 15 wt % based on the total weight of the separator, and
the inorganic particles comprises boehmite.

14. The separator for secondary batteries according to claim 13, wherein the fibrous support has swelling resistance to an electrolyte solution.

15. The separator for secondary batteries according to claim 13, wherein a thickness of the separator is 5 µm to 50 µm.

16. The separator for secondary batteries according to claim 13, wherein the binder comprises at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene monomer (EPDM), sulfonated EPDM, styrene butadiene rubber (SBR), fluoro rubber, and polyimide.

17. The separator for secondary batteries according to claim 1, wherein the separator is a single layer structure.

18. The separator for secondary batteries according to claim 17, wherein the separator further comprises an adhesive material.

19. The separator for secondary batteries according to claim 13, wherein the separator is a single layer structure.

* * * * *